United States Patent [19]

Kniskern et al.

[11] Patent Number: 4,868,901
[45] Date of Patent: Sep. 19, 1989

[54] REFLECTED LIGHT DETECTING APPARATUS AND METHOD

[75] Inventors: Robert J. Kniskern, Fort Wayne; Timothy W. Dygert, Columbia City; Casey Chesney; Timothy Blomenberg, both of Fort Wayne, all of Ind.

[73] Assignee: Sci-Agra, Inc., Fort Wayne, Ind.

[21] Appl. No.: 107,792

[22] Filed: Oct. 13, 1987

[51] Int. Cl.[4] ............ G01V 9/04; G01N 9/04
[52] U.S. Cl. ............ 250/222.2; 250/223 R; 377/6
[58] Field of Search ............ 250/224, 222.2, 222.1, 250/223 R, 221; 235/98 C; 356/376, 54, 53, 379, 380, 385–387; 364/555, 564, 562, 560; 209/510, 511, 525; 382/50, 51, 8, 28; 377/53, 24, 6

[56] References Cited

U.S. PATENT DOCUMENTS

| | | | |
|---|---|---|---|
| 3,692,980 | 9/1972 | Getker | 377/6 |
| 3,692,985 | 9/1972 | Kalman | 377/6 |
| 4,139,766 | 2/1979 | Conway | 377/6 |
| 4,250,062 | 4/1981 | Lockett | 250/233 R |
| 4,281,765 | 8/1981 | Brazell et al. | 250/223 R |
| 4,308,959 | 1/1982 | Hoover et al. | 250/223 R |
| 4,528,680 | 7/1985 | Archambeault | 377/6 |
| 4,555,624 | 11/1985 | Steffen | 250/233 R |
| 4,645,080 | 2/1987 | Scopatz | 250/223 R |
| 4,687,107 | 8/1987 | Brown et al. | 364/564 |
| 4,693,378 | 9/1987 | Azegami et al. | 364/564 |
| 4,782,500 | 11/1988 | Lyngsie | 377/6 |

OTHER PUBLICATIONS

NASA Tech Briefs, vol. 11, No. 10, Nov./Dec. 1987; "Optoelectronic Proximity Sensor Finds Edges" p. 40 and p. 42.

Primary Examiner—David C. Nelms
Assistant Examiner—Michael Messinger
Attorney, Agent, or Firm—Baker & Daniels

[57] ABSTRACT

Device and method for detecting the contour or shape of one or more articles by projecting multiple light beams on a different portions of an atricle, and measuring the level of light reflected from the article. The amount of light reflected indicates the distance of the light emitter/detector from the article. Readings from multiple light emitter/detector pairs provide an indication of the contour of the object. The readings may be processed to provide an indication of the number and size of articles passing by the sensors. The device may be placed over a conveyor carrying objects to be counted and/or sized.

32 Claims, 7 Drawing Sheets

SENSOR

| READING | 1 | 2 | 3 | 4 | 5 | 6 | 7 | 8 |
|---|---|---|---|---|---|---|---|---|
| 1 | 89 | 98 | 89 | 82 | 87 | 99 | 105 | 71 |
| 2 | 89 | 98 | 89 | 82 | 87 | 103 | 113 | 71 |
| 3 | 89 | 98 | 89 | 82 | 87 | 111 | 122 | 74 |
| 4 | 89 | 98 | 89 | 82 | 88 | 117 | 130 | 79 |
| 5 | 89 | 98 | 89 | 82 | 89 | 122 | 138 | 86 |
| 6 | 91 | 98 | 87 | 93 | 89 | 123 | 141 | 90 |
| 7 | 94 | 102 | 87 | 83 | 90 | 123 | 143 | 95 |
| 8 | 95 | 107 | 91 | 79 | 90 | 123 | 143 | 101 |
| 9 | 103 | 113 | 95 | 83 | 91 | 119 | 140 | 105 |
| 10 | 109 | 123 | 99 | 87 | 91 | 115 | 134* | 107 |
| 11 | 117 | 127 | 105 | 90 | 90 | 110 | 126 | 107 |
| 12 | 123 | 137 | 110 | 93 | 90 | 105 | 117 | 103 |
| 13 | 127 | 143 | 115 | 95 | 89 | 101 | 107 | 97 |
| 14 | 127 | 143 | 117 | 95 | 97 | 95 | 102 | 91 |
| 15 | 135 | 143 | 119 | 99 | 95 | 95 | 99 | 85 |
| 16 | 135 | 143 | 117 | 95 | 87 | 94 | 99 | 79 |
| 17 | 127 | 139 | 115 | 93 | 85 | 95 | 102 | 77 |
| 18 | 123* | 127 | 111 | 90* | 85 | 99 | 105 | 75 |
| 19 | 115 | 119 | 105 | 86 | 85 | 101 | 109 | 74 |
| 20 | 107 | 110 | 95 | 83 | 85 | 106 | 117 | 75 |
| 21 | 99 | 102 | 92 | 81 | 86 | 111 | 123 | 78 |
| 22 | 91 | 95 | 87 | 79 | 87 | 114 | 127 | 84 |
| 23 | 89 | 95 | 85 | 81 | 87 | 116 | 133 | 91 |
| 24 | 91 | 95 | 84 | 81 | 88 | 118 | 137 | 97 |
| 25 | 95 | 101 | 85 | 78 | 87 | 118 | 139 | 105 |
| 26 | 95 | 101 | 85 | 78 | 87 | 117 | 138 | 110 |
| 27 | 95 | 101 | 85 | 78 | 87 | 115 | 135 | 111 |
| 28 | 95 | 101 | 85 | 78 | 87 | 111 | 127* | 110 |
| 29 | 95 | 101 | 85 | 78 | 88 | 107 | 120 | 105 |
| 30 | 95 | 101 | 85 | 78 | 87 | 103 | 111 | 98 |
| 31 | 95 | 101 | 85 | 78 | 89 | 99 | 106 | 91 |

*COUNT SIGNAL GENERATED

Fig.6

REFLECTED LIGHT DETECTING APPARATUS AND METHOD

FIELD OF THE INVENTION

The invention relates to devices and methods for detecting the contour or shape of one or more articles by use of reflected light.

BACKGROUND

Several devices are known in the art for determining physical characteristics of articles using light. Most common are devices which employ a light emitter and detector, and which provide a digital indication of the presence or absence of an object if it breaks the path between the emitter and detector. For example, in U.S. Pat. No. 4,571,498, two perpendicularly disposed arrays of such light detector/emitter pairs are used to determine the rough shape of an object. Such devices are of limited utility because only one object may be in the path between the light detectors and emitters, and placing many objects in single file for scanning can cause a significant backlog in production operations.

More germane to the present invention are devices which use light reflected from the surface of an article to determine certain characteristics of the article. For example, in U.S. Pat. No. 4,276,983, light reflected from an article is used to determine the color of the article. The device disclosed therein may be used to sort beans based on color. In U.S. Pat. No. 4,450,352, expected and regular surface contour changes are detected by employing several light detectors strategically placed so that the contour changes affect the light sensed by the light detectors. U.S. Pat. No. 4,456,829 discloses a device for determining the distance from a light detector to a reflective surface by comparing emitted light to a reference beam by use of a rotating scanner. U.S. Pat. No. 4,510,504 discloses a device for detecting a deflection amount of ink by projecting light on a flying ink drop, and detecting the extent of deflection of the ink drop based on the behavior of the light reflected by the ink drop. Multiple light detectors may be used to determine the extent of deflection.

SUMMARY OF THE INVENTION

The present invention employs a plurality of light emitter/detector pairs ("LEDPs"). Each light detector detects the level of light reflected from its associated light emitter. The closer an object is to the LEDP, the more light will be reflected toward, and monitored by, the light detector. The amount of reflected light is converted into a signal and stored. A set of signals from all LEDPs provides an indication of the contour of one "slice" of the scanned area. Multiple slice readings provide a three dimensional indication of the contour of the scanned area. The invention may be used to count the number of objects in a scanned area, and to compute the volume of the objects. When the invention is used to count objects on a surface, each object should be surrounded by an area that reflects less light than the objects themselves. The objects may be touching each other as long as the area where they touch reflects less light than the remainder of the objects. For example, if objects are touching, it is sufficient if the peripheral portions of the objects reflect less light than the center portion.

Alternatively, the invention may be used to count those portions of a single article that have reflective characteristics greater than the remaining area.

The invention is ideally suited for counting and sizing objects traveling on a moving conveyor belt, without the necessity of placing the objects in single file.

Accordingly, it is an object of the invention to provide a method and device for determining the contour of an object.

Another object of the invention is to provide a method and device for determining the volume, size and weight of an object.

Another object of the invention is to provide a method and device for counting the number of high light reflective areas on a surface, regardless of their location on the surface.

Another object of the invention is to provide a method and device for counting the number of objects on a pathway on the basis of the amount of light reflected by the objects and the pathway.

Another object of the invention is to provide a method and device for counting the number of objects on a pathway on the basis of a series of reflected light readings which does not require the storage of more than a single set of reflected light readings for reference.

Another object of the invention is to provide a method for counting objects using light readings that does not require calibration or comparison of light readings from adjacent light detectors.

BRIEF DESCRIPTION OF THE DRAWINGS

FIG. 6 is a representative array of signal values indicating the detected contour of the pathway shown in FIG. 5.

DESCRIPTION OF THE PREFERRED EMBODIMENT

Figure 1:
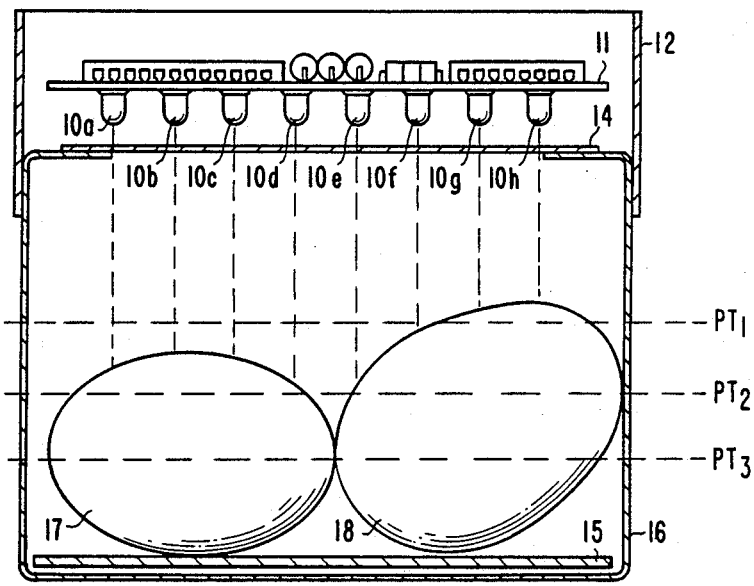
FIG. 1 is a vertical sectional view of a light emitter/detection element of the invention positioned above an egg transfer belt.

FIG. 1 is a vertical sectional view of a light emitter/detection element of the invention positioned above an egg transfer belt. Light emitter-detector pairs ("LEDPs" or "sensors") 10a through 10h are equally distanced and linearly mounted on board 11. Housing 12 supports ambient light filter 14. which is selected to allow the light emitted and received from the LEDPs to pass therethrough, but which prevents the transmission of ambient light. Housing 12 should be sealed to prevent entry of dirt and ambient light. Housing 12 is positioned above belt 15 by conveyor chute 16. The LEDPs 10 traverse the width of belt 15 and are spaced so that any object of desired detectable size will pass under at least one LEDP.

Objects, such as first egg 17 and second egg 18, are moved by belt 15 past LEDPs 10. Such objects need not necessarily be placed in single file in order for measurements to be taken by the invention. Each LEDP is polled and emits light perpendicularly from the plane of the LEDPs and toward belt 15. If an object such as egg 17 or 18 is within the path of light emitted by any LEDP, the light is reflected toward, and detected by, the LEDP. The closer the object is to the LEDP, the more light will be reflected. Thus, an indication of the general contour of the object(s) may be obtained on the basis of the amount of light reflected by the object(s).

The invention should be used with objects having a substantially uniform reflective surface, such that the amount of light reflected by the object toward the light detectors is relative to the distance from the object to the scanner. For example, objects with large amounts of dirt that reflect significantly less light than the rest of the object may not be suitable for the present invention. Alternatively, if it is desired only to count high light-reflective portions of a single object, then the high light-reflective portions of the objects should reflect more light than the surrounding area.

In order to avoid light emitted from one LEDP from being detected by an adjacent LEDP, each light detector may be separately activated. In the preferred embodiment, an activation time of 0.5 ms. is used. More accurate light readings are obtained by directly limiting exposure of the LEDPs to ambient light by chute walls 17 and 18, and housing 12.

Each polling cycle of all LEDPs results in the reading of a "slice" of the area under the LEDPs at a particular time. As the objects move along belt 15, additional "slice" readings may be taken. Thus, each LEDP may be considered as representative of an X-coordinate, each sequential reading may be considered representative of a Y-coordinate (or time coordinate) for the particular X-coordinate, and the actual signal representing the amount of light detected may be considered representative of the Z-coordinate of the area being scanned.

Figure 2:
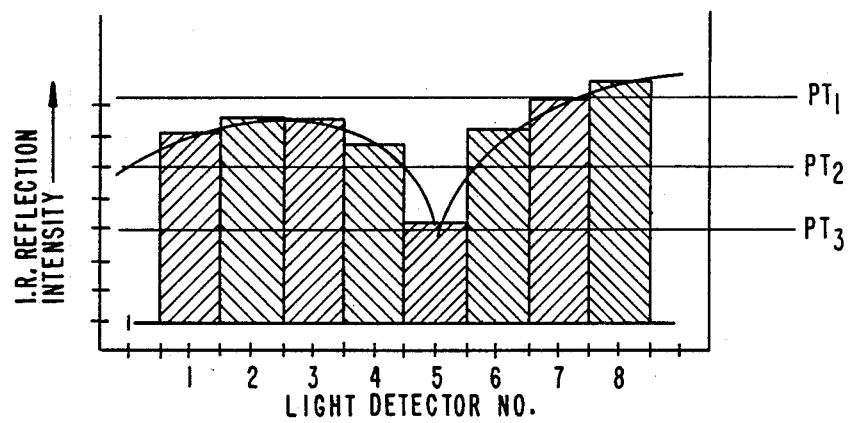
FIG. 2 is a graph showing the light detection readings for one polling of each light detector for the egg transfer belt shown in FIG. 1.

FIG. 2 is a graph showing the light detection readings for one polling of each light detector for the egg transfer belt shown in FIG. 1. The X-axis represents LEDPs 10a through 10h, and the Y-axis represents the amount of light detected. As objects are in the path of each LEDP 10a through 10h, light is reflected from the objects to each LEDP. The indicated light readings parallel the contour of the objects.

The number of LEDPs chosen to traverse a path for a given application depends on several features, such as the width of the path, the size of the objects, the number of objects that can fit across the path, and the desired resolution. Generally, greater resolution is preferable to compute the volumes of objects, while less resolution is needed only to count objects.

The distance between each LEDP is also important when the invention is used to count objects. The invention counts an object by detecting a contiguous are that reflects a high level of light. In order to obtain accurate count readings, each object must reflect more light to the LEDPs than the surface on which it is located. In addition, if two objects are touching, the area of contact must reflect less light than the remaining area of the object. By detecting the areas that reflect less light, the invention distinguishes objects.

The LEDPs should be spaced from each other at a distance that is less than the minimum width of the low-reflected light areas between objects. For example, if the area of low-reflected light is one-half inch wide where two objects touch, as in FIG. 1, for example, then the LEDPs should be spaced less than one-half inch from each other. Such spacing ensures that the low-light reflected areas will be detected by the LEDPs, and hence distinguish high-light reflective areas.

FIG. 2 also demonstrates the importance of the PRESENCE THRESHOLD. As described more fully below, the method of the invention requires the establishment of a PRESENCE THRESHOLD that is indicative of the presence of a high light reflective portion of an object beneath an LEDP. In FIG. 2, PT2 is indicative of a suitable PRESENCE THRESHOLD because it represents a light level greater than the less reflective perimeter portions of the eggs shown in FIG. 1, and because it is not so high that it fails to indicate the presence of even the smallest egg (or other object) to be scanned. A theoretical PRESENCE THRESHOLD at the level indicated by PT3 would be too low because it would be less than the least amount of light reflected by the area between objects as shown for scanner 5. Thus, with a PRESENCE THRESHOLD at this level, it would be impossible to detect the "edges" of objects. A theoretical PRESENCE THRESHOLD at the level indicated by PT1 would be too high because it is greater than the greatest amount of reflected light by an object to be scanned, namely egg 17 in FIG. 1. Therefore, this egg would not be counted if the PRESENCE THRESHOLD were set at a level of PT3.

Figure 3:
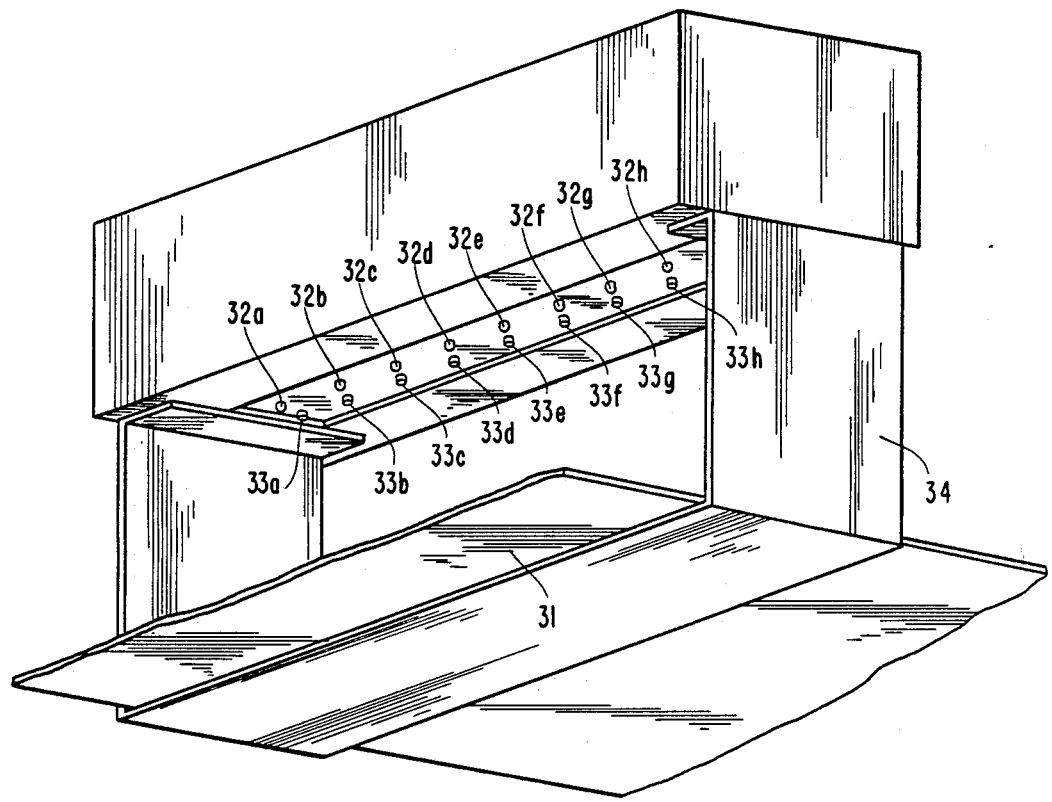
FIG. 3 is a perspective view of the light emitter/detection unit of the invention.

FIG. 3 is a perspective view of the light emitter/detection unit of the invention. As objects are carried by belt 31, they pass beneath light emitters 32a through 32h and light detectors 33a through 33h. Outer LEDPs 32a and 33h, and 32h and 33h, are such that no object may pass between these LEDPs and the edges of the pathway, (chute 34), without a portion of the object passing beneath an LEDP and reflecting an intensity of light above the PRESENCE THRESHOLD back to the LEDP.

It should also be noted that the invention does not require separate light emitters for each light detectors. For example, a single light tube may be placed across the location where the light emitters are shown in FIG. 3, in lieu of separate light emitters.

Figure 4:
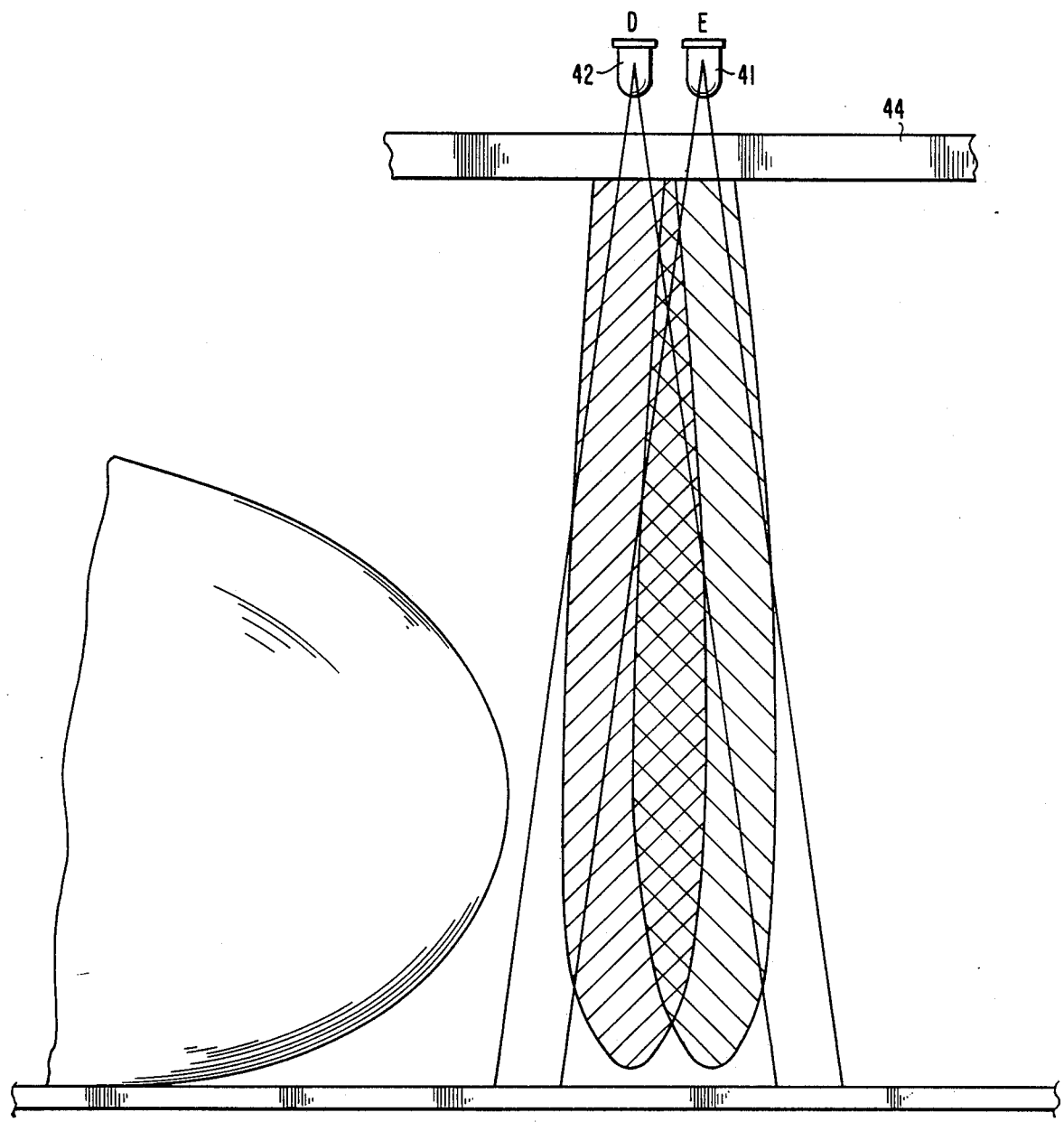
FIG. 4 is a sectional view showing the light emitter beam width and light detector focus width in accordance with the preferred embodiment.

FIG. 4 is a sectional view showing the light emitter beam width and light detector focus width in accordance with the preferred embodiment. For applications where the distance from the LEDPs to the objects to be detected will be relatively short (i.e., several inches), it is preferable to use a light emitter 41 having a wide (16 degree) beam width. For such applications, narrower beam widths tend to cause too much emitted light to be reflected back to the light detector, regardless of the distance from the object to the light emitter. For applications where objects will be more than several inches from the LEDPs, a narrower emitter beam may be employed.

However, in all instances, it is generally desirable to use a light detector having a relatively narrow beam of focus. This allows the detector to detect only light directly below it, and not stray ambient light. In the preferred embodiment, light detector 42 has a 16 degree focus beam width. Emitter 41 and detector 42 should be positioned as closely together as possible so the detector focus beam intersects with the emitter beam as much as possible, as shown by the cross-hatched area.

FIG. 4 also shows filter 44, which serves to filter ambient light from light detector 42. In the preferred embodiment, an acrylite 668-0 blue filter is employed.

Figure 5:
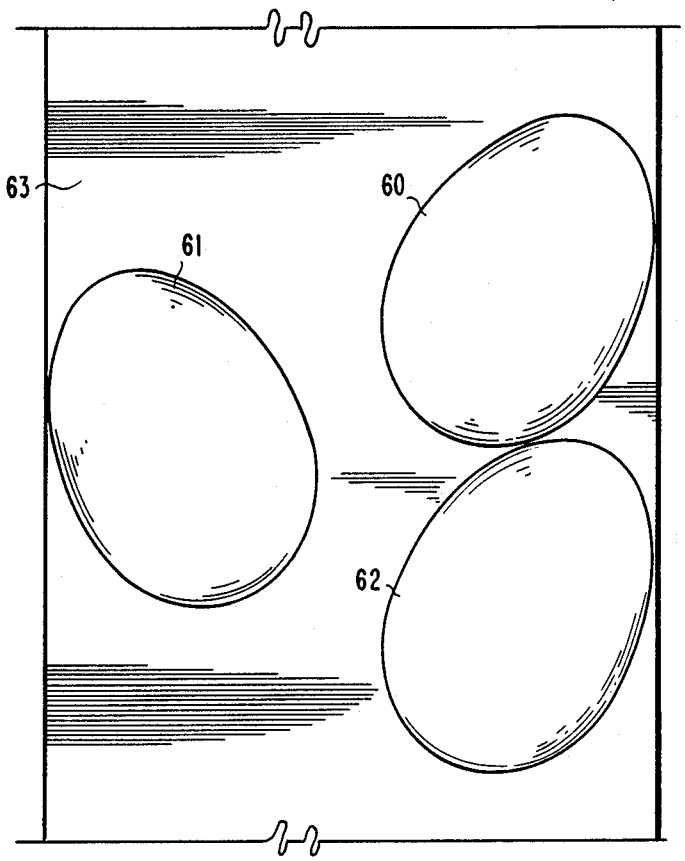
FIG. 5 is a top view of a typical pathway containing objects which may be monitored by the present invention.

FIG. 5 is a top view of a typical pathway containing objects which may be monitored by the present invention. In this figure, eggs 60, 61 and 62 lie on belt 63, which moves past scanner (not shown). The eggs are higher (closer to the scanner) in their center portions than around their peripheral portions. The eggs generate the light readings shown in FIG. 6.

FIG. 6 is a representative array of signal values indicating the detected contour ff the pathway shown in FIG. 5. Initially, it is helpful to note several features of FIG. 6. First, even though each LEDP at some time has no egg beneath it, the light readings in such instances are different for different LEDPs. For example, in reading no. 1, LEDPs 1 through 4 indicate light reflected only from the belt, as there are no objects beneath these LEDPs on the belt. However, the light readings vary from 82 for LEDP 4 to 98 for LEDP 2. An important aspect of the invention is that the LEDP's need not be calibrated, because adjacent light readings need not be compared. The detection of objects is made by detecting changes in individual sensors, and grouping adjacent LEDPs that also exhibit changes in light intensity readings. However, it is not necessary for adjacent LEDPs generate similar light readings for similar intensities of reflected light. In fact, each LEDP may have a PRESENCE THRESHOLD that is different from the other LEDPs. However, if the LEDPs are calibrated, then a single PRESENCE THRESHOLD may be used. All that is required is that there be no sensor whose range of values is so narrow that it: (1) never falls below a PRESENCE THRESHOLD; or (2) is unaffected by an increase in the level of reflected light caused by an object passing by under the sensor.

It should also be noted that there may be minor fluctuations in the LEDP readings even when there is no significant change in the area being scanned. For example, in readings 22 to 24, sensor 1 changes from 91 to 89 and back to 91, even though there is no object passing beneath the sensor during this period. These minor fluctuations may be caused by a number of factors, such as vibration or dirt. However, such fluctuations do not affect the method of the invention because they are not significant.

It may be appreciated that the values are higher in areas 70, 71 and 72 that correspond to locations of eggs 60, 61, and 62 in FIG. 5. Also, the values between the eggs 73 are below a certain value, in this case, 99. A method of counting the eggs may be appreciated by examining the values in FIG. 6. In the instant example, an egg is counted by detecting a drop of a light reading by 9 or more. For example, area 70 begins with light readings of 99 to 71 in sensors 6 through 8. This level rises to a maximum of 143 (sensor 7), and drops to 134 in sensor 7 at reading 10, at which time an egg count will be generated. The light intensity continues to drop to a level of 99 on the 15th reading. As described more fully below, all adjacent sensors which are above the PRESENCE THRESHOLD are grouped together for the purpose of counting an egg so that only one count is recorded even if more than one drops by more than 9.

In the example shown in FIGS. 5 and 6, a PRESENCE THRESHOLD of 99 for all sensors is assumed. This means that when a sensor reaches 99, there is an object below the sensor. There may or may not be an object below a sensor when a light reading is below the PRESENCE THRESHOLD, but when a light reading is at or above the PRESENCE THRESHOLD, there is definitely an object below the sensor. The PEAK DETECTION THRESHOLD is 9, which means that a portion of an object has passed by a sensor when a light reading that was above the PRESENCE THRESHOLD drops by 9. The NEW OBJECT THRESHOLD is 4, which means that if a light reading drops by 9, causing a count, but is still above the PRESENCE THRESHOLD, and then rises by at least 4, it will be assumed that a new object has been encountered.

Initially, all LEDPs are enabled, meaning they will be able to generate counts. Although the means for "enabling" may be electronic, in the preferred embodiment the enabling means consists of certain steps in a computer program.

Each sensor has separate MAXIMUM LIGHT LEVEL and MINIMUM LIGHT LEVEL indicators, which keep track of the highest and lowest light readings. The MAXIMUM LIGHT LEVEL indicator is used to determine if a light reading has dropped by the PEAK DETECTION THRESHOLD amount. It is reset each time a new object is encountered. A new object is encountered if: (1) a light reading rises above the PRESENCE THRESHOLD; or (2) while above the PRESENCE THRESHOLD but after falling by the PEAK DETECTION THRESHOLD amount, a light reading rises by the NEW OBJECT THRESHOLD amount. Whenever a new object is encountered, the MAXIMUM LIGHT LEVEL indicator is reset to the current light reading.

The MINIMUM LIGHT LEVEL indicator is used to determine if, after a peak has been detected, a new object is encountered before the light reading falls below the PRESENCE THRESHOLD. This is the case if after falling from the MAXIMUM LIGHT LEVEL by at least the PEAK DETECTION THRESHOLD amount, the light reading rises by the NEW OBJECT THRESHOLD amount from the MINIMUM LIGHT LEVEL indicator, while the light reading is above the PRESENCE THRESHOLD.

In other words, the MAXIMUM LIGHT LEVEL indicator keeps track of the highest light reading between the "valleys" in front of and behind objects, while the MINIMUM LIGHT LEVEL indicator keeps track of the lowest light reading in the valleys between objects.

Initially, the MAXIMUM LIGHT LEVEL for each sensor is set to a low value (below the PRESENCE THRESHOLD), and the MINIMUM LIGHT LEVEL for each sensor is set to a high value (above the PRESENCE THRESHOLD).

The following summarizes the preferred embodiment of the method of the invention with respect to the light readings shown in FIG. 5:

Reading 1 If it is assumed that the MINIMUM LIGHT LEVEL indicator for each sensor was initialized to a level greater than 105, then the MINIMUM LIGHT LEVEL indicators for all sensors will be set to their current values, or 89 for sensor 1, 98 for sensor 2, etc. Sensors 1 through 5, and 8 are below the PRESENCE THRESHOLD of 99, so no other action is taken with respect to these sensors. Because sensors 6 and 7 are contiguous and above the PRESENCE THRESHOLD, they are grouped together. By "grouping" adjacent sensors, multiple sensors are prevented from generating multiple count signals for a single object. In the preferred embodiment, the "grouping" is accomplished by steps in a computer program, even though the same objective may be accomplished by using appropriate circuitry. Additionally in reading 1, the MAXIMUM LIGHT LEVEL indicators for sensors 6 and 7 will be set to 99 and 105, respectively.

Reading 2 The MAXIMUM LIGHT LEVEL indicators of sensors 6 and 7 will be increased to 103 and 113.

Reading 3 The MAXIMUM LIGHT LEVEL indicators for sensors 6 and 7 will be increased to 111 and 122.

Reading 4 The MAXIMUM LIGHT LEVEL indicators for sensors 6 and 7 will be increased to 117 and 130.

Reading 5 The MAXIMUM LIGHT LEVEL indicators for sensors 6 and 7 will be increased to 122 and 138.

Reading 6 The MAXIMUM LIGHT LEVEL indicators for sensors 6 and 7 will be increased to 123 and 141.

Reading 7 The MAXIMUM LIGHT LEVEL indicator for sensor 7 will be increased to 143. In addition, sensor 2 has increased above the PRESENCE THRESHOLD, so its MAXIMUM LIGHT LEVEL indicator will be reset to 102. Sensor 2 will not be grouped with the 6 and 7 group because intermediate sensors 3, 4 and 5 are below the PRESENCE THRESHOLD.

Reading 8 Sensor 8 has risen above the PRESENCE THRESHOLD, so its MAXIMUM LIGHT LEVEL indicator is set to its current value of 101. Also, sensor 8 will be grouped with sensors 6 and 7, since it is contiguous to those sensors and they are above the PRESENCE THRESHOLD. The MAXIMUM LIGHT LEVEL indicator for sensor 2 will be set to 107.

Reading 9 Sensor 1 has risen above the PRESENCE THRESHOLD, so its MAXIMUM LIGHT LEVEL indicator is reset to 103. The MAXIMUM LIGHT LEVEL indicator for sensor 2 is increased to 113. Because sensors 1 and 2 are both above the PRESENCE THRESHOLD and contiguous, they will be grouped together. The MAXIMUM LIGHT LEVEL indicator for sensor 8 will also increase from 101 to 105. It is noted that the values of sensors 6 and 7 have both fallen. However, the MINIMUM LIGHT LEVEL indicators for these sensors will not change, because (1) their present MINIMUM LIGHT LEVEL indicators are still 99 and 105, (from reading 1), which are less than the current levels of 119 and 140; and (2) MINIMUM LIGHT LEVEL indicators are only reset after a light reading has dropped by the PEAK DETECTION THRESHOLD.

Reading 10 Sensor 7 has dropped by the PEAK DETECTION THRESHOLD of 9 (143−134). Therefore, a count signal will be generated. Also, in the preferred embodiment, the count signal increments a counter in computer memory.

Additionally at reading 10, sensors 6, 7 and 8 will all be temporarily disabled from generating future count signals, so that a single object is not counted twice if the same or another sensor also falls by the PEAK DETECTION THRESHOLD. These sensors are disabled because they are all above the PRESENCE THRESHOLD and contiguous to sensor 7. A sensor will be placed in a group if it rises above the PRESENCE THRESHOLD, or if, since the last time it was enabled, it was contiguous to any other enabled sensor (or group of enabled sensors) that was also above the PRESENCE THRESHOLD.

Also at reading 10, the MAXIMUM LIGHT LEVEL indicators for sensors 1, 2 and 8 will be set to their current values of 109, 123 and 107. In addition, sensor 3 has increased to the PRESENCE THRESHOLD, so it will be grouped with sensors 1 and 2 because they are above the PRESENCE THRESHOLD, enabled, and contiguous to sensor 3. Moreover, the MAXIMUM LIGHT LEVEL indicator for sensor 3 will be reset to its current reading of 99.

Reading 11 The MAXIMUM LIGHT LEVEL indicators for sensors 1 through 3 will be increased to 117, 127 and 105. Sensor 7 has dropped, so its MINIMUM LIGHT LEVEL indicator will be set to 126. It should be noted that sensor 6 has now dropped by the PEAK DETECTION THRESHOLD of 9 (123−110=13). However, a count signal is not generated because sensor 6 was disabled from generating a count signal while processing reading 10. However, the MINIMUM LIGHT LEVEL indicator for this sensor will be set to 110. Also while processing reading 11, the MAXIMUM LIGHT LEVEL indicators for sensors 1 through 3 will be increased to their current values of 117 127 and 105.

Reading 12 New MAXIMUM LIGHT LEVELS will be set for sensors 1 through 3, and the MINIMUM LIGHT LEVEL for sensors 6 and 7 will be set to 105 and 117.

Reading 13 Sensors 6 through 8 have continued to decrease. Sensor 8 is now below the PRESENCE THRESHOLD. Because it has fallen by the PEAK DETECTION THRESHOLD amount (107−97=10), it is reenabled to generate future count signals. Sensors 6 and 7 remain disabled, but new MINIMUM LIGHT LEVELS of 101 and 107 are set. New MAXIMUM LIGHT LEVELS will again be set for sensors 1 through 3.

Reading 14 Sensor 6 has fallen below the PRESENCE THRESHOLD, so it is reenabled to generate count signals since it has already passed the PEAK DETECTION THRESHOLD. The MINIMUM LIGHT LEVEL indicator for sensor 7 is set to 102. A new MAXIMUM LIGHT LEVEL of 117 will be set for sensor 3.

Reading 15 Sensor 4 is now 99, so it is grouped with sensors 1 through 3, which are above the PRESENCE THRESHOLD and contiguous to sensor 4. New MAXIMUM LIGHT LEVELS are set for sensors 1, 3 and 4. The MINIMUM LIGHT LEVEL for sensor 7 is set to 99.

Reading 16 Sensor 4 drops to 95, below the PRESENCE THRESHOLD. However, sensor 4 continues to be grouped with sensors 1 through 3 because it was earlier contiguous to these sensors while above the PRESENCE THRESHOLD. In accordance with the invention, a count signal could be generated whenever the first sensor in any group falls below the PRESENCE THRESHOLD. However in the preferred embodiment, a count signal is only generated after a light level drops by the PEAK DETECTION THRESHOLD amount Therefore a count signal will not be generated by this group at this time.

Reading 17 Sensors 1 through 3 have all dropped. However, the MINIMUM LIGHT LEVELS for these sensors are 89, 98 and 98 (from reading 1) so the MINIMUM LIGHT LEVELS for these sensors do not change. It is interesting to note that sensor 7 has risen from 99 to 102, without going below the PRESENCE THRESHOLD. The MAXIMUM LIGHT LEVEL for this sensor will not change, because it is still 143 (from reading 7).

Reading 18 Sensor 1 has dropped by the PEAK DETECTION THRESHOLD, to 123 from its MAXIMUM LIGHT LEVEL of 135. Therefore, a count signal will be generated, and the MINIMUM LIGHT LEVEL for sensor 1 will be set to 123. In addition, sensors 1 through 3 will be disabled from generating count signals. It is also interesting to note that sensor 4 has also fallen by the PEAK DETECTION THRESHOLD amount from 99 to 90. Even though sensor 4's current value is below the PRESENCE THRESHOLD, this drop would be sufficient to generate a count signal in the preferred embodiment, if a count signal had not already been generated by sensor 1.

In the preferred embodiment, the drop by sensor 4 below the PRESENCE THRESHOLD will cause sensor 4 to be reenabled to generate future count signals. In addition, sensor 7 has risen from its MINIMUM LIGHT LEVEL light level of 99 in reading 15 to 105. Because this increase is greater than 4, the NEW OBJECT THRESHOLD, and because this sensor has not fallen below the PRESENCE THRESHOLD since it was disabled, this indicates that a new object has been detected. Therefore, the MAXIMUM LIGHT LEVEL indicator for sensor 7 will be reset to the current value of 105, and the sensor will be enabled to generate a count signal. Additionally, sensor 6 has risen to the PRESENCE THRESHOLD of 99, so a new MAXIMUM LIGHT LEVEL of 99 will be set for sensor 6, and sensors 6 and 7 will be grouped together.

Reading 19 The MINIMUM LIGHT LEVELS for sensors 1 through 3 will be set to their current values. Sensor 6 has risen, so its MAXIMUM LIGHT LEVEL indicator will be set to 101. The MAXIMUM LIGHT LEVEL indicator for sensor 7 will be increased to 109.

Reading 20 New MINIMUM LIGHT LEVELS will be set for sensors 1 and 2. Sensor 3 has fallen below the PRESENCE THRESHOLD. Because it has already fallen by the PEAK DETECTION THRESHOLD, it will be enabled to generate future count signals. New MAXIMUM LIGHT LEVELS will be set for sensors 6 and 7.

Reading 21 New MINIMUM LIGHT LEVELS will be set for sensors 1 and 2, and new MAXIMUM LIGHT LEVELS will be set for sensors 6 and 7.

Reading 22 Sensors 1 and 2 have both fallen below the PRESENCE THRESHOLD. Because they also have both dropped by the PEAK DETECTION THRESHOLD, they will be enabled to generate count signals. New MAXIMUM LIGHT LEVELS will be set for sensors 6 and 7.

Reading 23 New MAXIMUM LIGHT LEVELS will be set for sensors 6 and 7.

Reading 24 NeW MAXIMUM LIGHT LEVELS will be set for sensors 6 and 7.

Reading 25 A new MAXIMUM LIGHT LEVEL will be set for sensor 7 Sensor 8 has also passed the PRESENCE THRESHOLD, so its MAXIMUM LIGHT LEVEL will be set to 105, and it will be grouped with adjacent enabled sensors 6 and 7.

Reading 26 A new MAXIMUM LIGHT LEVEL will be set for sensor 8.

Reading 27 A ne MAXIMUM LIGHT LEVEL will be set for sensor 8.

Reading 28 Sensor 7 has fallen by the PEAK DETECTION THRESHOLD amount of 9, falling by 10 from 137 to 127. Since this is the first sensor in the 6-7-8 group to fall by this amount, a count signal will be generated. In addition, the MINIMUM LIGHT LEVEL for sensor 7 will be reset to its current value of 127. Sensors 6 through 8 will all be disabled from generating future count signals.

Reading 29 Sensor 6 has fallen by the PEAK DETECTION THRESHOLD amount from 118 to 107, so its MINIMUM LIGHT LEVEL indicator will be set to 107. A new MINIMUM LIGHT LEVEL will also be set for sensor 7.

Reading 30 New MINIMUM LIGHT LEVELS will be set for sensors 6 and 7. In addition, sensor 8 has both fallen by the PEAK DETECTION THRESHOLD, and fallen below the PRESENCE THRESHOLD. Therefore, the MINIMUM LIGHT LEVEL indicator for sensor 8 will be reset to 98 and sensor 8 will be enabled to generate future count signals. New MINIMUM LIGHT LEVELS will also be set for sensors 6 and 7.

Reading 31 New MINIMUM LIGHT LEVELS will be set for sensors 6 and 7.

It should be noted that the steps outlined above represent only the steps of the preferred embodiment. Many changes could be made in the method of the invention as described more fully below.

Figure 7:
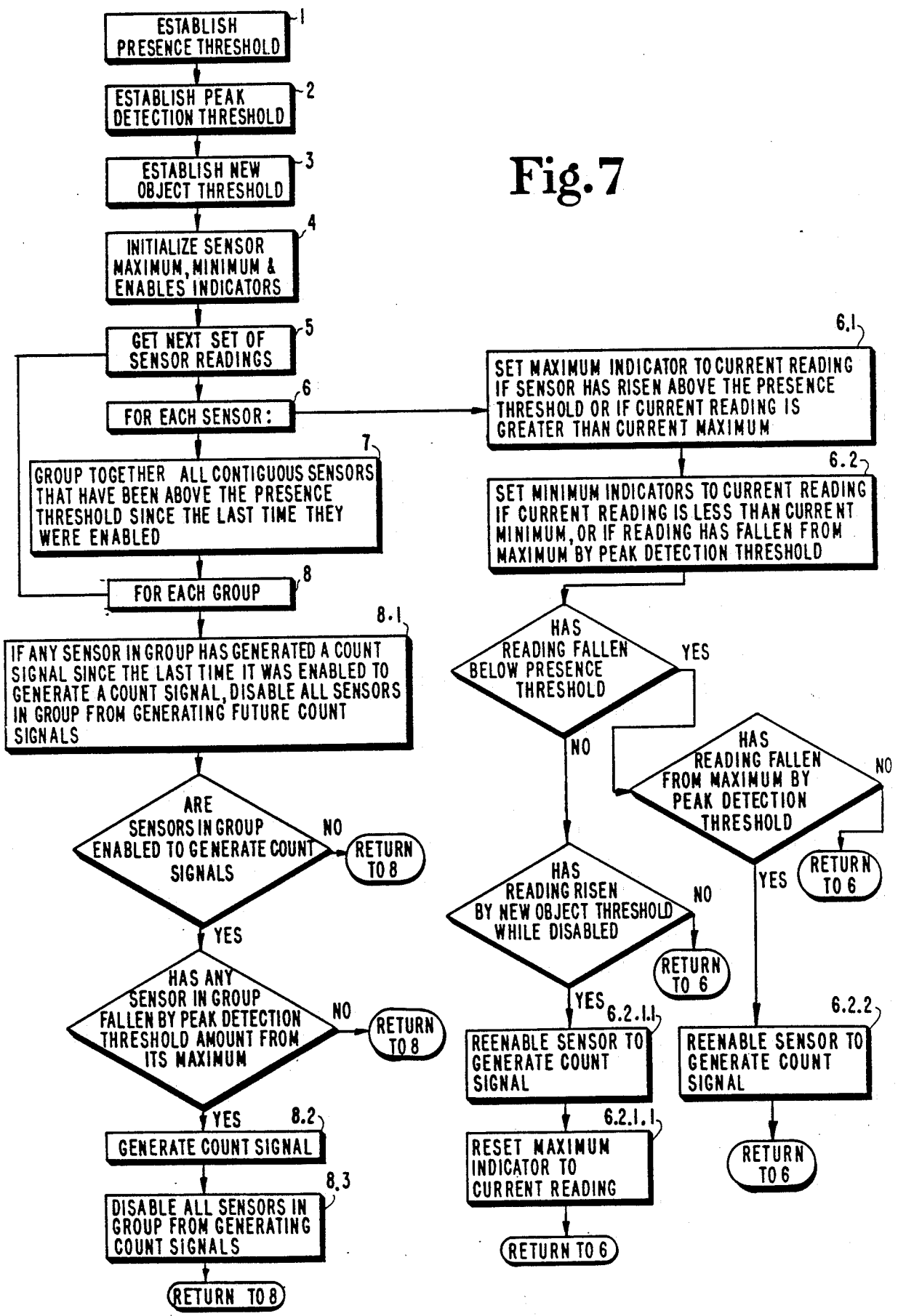
FIG. 7 is a functional block diagram of the method of the invention used to count high light reflective areas moving along a monitored path of the invention.

FIG. 7 is a functional block diagram of the method of the invention used to count high light reflective areas of a scanned area. FIG. 7 summarizes the method of preferred embodiment of the invention described above.

An initial step in the method of the invention is to establish a PRESENCE THRESHOLD. This threshold is indicative of the presence of an object below a sensor. It should be emphasized that each sensor may have its own PRESENCE THRESHOLD. In the above discussion of FIG. 6 however, each sensor had the same PRESENCE THRESHOLD.

As the PRESENCE THRESHOLD is dependent on the particular circuitry employed, it is usually established by passing an object by a sensor. The PRESENCE THRESHOLD for a sensor is set to the value of the light reading when it begins to increase due to the presence of the object. The PRESENCE THRESHOLD may also be adjusted as required based on the results of a sample run of objects by the sensors using the method of the invention. Additionally, as described more fully below, the circuitry of the invention may be adjusted to automatically adjust the current to one or more light emitters. In such instances, the PRESENCE THRESHOLD may also be adjusted.

Another early step in the method of the invention is the establishment of a PEAK DETECTION THRESHOLD. This threshold is indicative of the amount by which a light level must drop to be indicate the passing of an article by the sensors. The best way to establish the peak detection threshold is to examine light readings of objects passing by sensors. There could likely be some aberration in the light level readings for an object caused by dirt or vibration. Initially, the PEAK DETECTION THRESHOLD should be set to a number approximately fifty percent greater than the maximum aberration. For example, if the surface of an object is a constant hight, but yet a light reading goes from, 100 to 106 and immediately back to 100, the aberration is 6, and the initial PEAK DETECTION THRESHOLD may be set to 9. Again, readouts of test light readings may also be used to fine tune the preferred PEAK DETECTION THRESHOLD.

Another early step in the method of the invention is to establish a NEW OBJECT THRESHOLD. This threshold is only necessary for applications in which: (1) objects may be touching each other; and (2) the PRESENCE THRESHOLD is set to a value below the amount of light that will be reflected by such points of contact. A NEW OBJECT THRESHOLD may be determined by putting the contact point between two touching objects beneath a sensor and noting in the MINIMUM LIGHT LEVEL light level. The difference between this amount and the PRESENCE THRESHOLD may be used as an initial NEW OBJECT THRESHOLD. Again, readouts of test light readings may also be used to fine tune the NEW OBJECT THRESHOLD.

Another early step in the method of the invention is to set MAXIMUM LIGHT LEVEL, MINIMUM LIGHT LEVEL and ENABLED indicators for each sensor. The MAXIMUM LIGHT LEVEL indicators should initially be set to a low value, (below the PRESENCE THRESHOLD), so that it will be quickly reset when the first set of readings is processed. Likewise, the MINIMUM LIGHT LEVEL indicators should initially be set to a high value (above the PRESENCE THRESHOLD). The enabled indicators should be set to allow each sensor to generate count signals.

Once the foregoing indicators are established, processing of light signals may commence. A "set" of light signals consists of a reading from each sensor. In the preferred embodiment, these readings are first processed individually, and then, if there are any contiguous groups of readings above the PRESENCE THRESHOLD in a set, each group is processed When processing begins, the MAXIMUM LIGHT LEVEL indicator for a sensor is set to the current reading if the current MAXIMUM LIGHT LEVEL is less than the current reading, or if the sensor has risen above the PRESENCE THRESHOLD since the previous reading. The MINIMUM LIGHT LEVEL indicator is set to the current reading if the current reading is less than the current MINIMUM LIGHT LEVEL, or if the current reading has fallen from its current MAXIMUM LIGHT LEVEL by the PEAK DETECTION THRESHOLD amount.

Next, it is determined if the reading has fallen below the PRESENCE THRESHOLD. If it has, but not by the PEAK DETECTION THRESHOLD amount from its current MAXIMUM LIGHT LEVEL, no further action is taken. If the sensor has fallen from its current MAXIMUM LIGHT LEVEL by the PEAK DETECTION THRESHOLD amount, indicating that an object has passed by the sensor, then the sensor is reenabled to generate count signals.

If a sensor has not fallen below the PRESENCE THRESHOLD, then it is determined if the sensor is currently disabled and if the sensor has increased by the NEW OBJECT THRESHOLD. If this is not the case, no further action is taken. If this is the case, then a new object has been encountered. Therefore, the sensor will be reenabled to generate future count signals, and its MAXIMUM LIGHT LEVEL indicator will be reset.

After the foregoing preliminary steps have been performed for each sensor, groups are designated for certain sensors. All enabled sensors that are contiguous to each other and that have been above the PRESENCE THRESHOLD since the last time they were enabled are grouped together. These sensors are grouped together because under these criterion, a single object has passed, or is below, these sensors. Therefore, multiple count signals will not be generated, even though more than one sensor in a group may pass the criterion for generating a count signal. If there is more than one group in a set of readings, they will always be separated by at least one sensor below the PRESENCE THRESHOLD.

Once the groups are established, it is determined if any sensor in the group has generated a count signal since it became a member of the group. This will be the case if any sensor is disabled from generating a count signal. If so, all sensors will be disabled from generating a count signal, and no further action is taken at this time. If the sensors in the group are enabled to generate a count signal, and any sensor in the group has fallen from its MAXIMUM LIGHT LEVEL by the PEAK DETECTION THRESHOLD amount, then an object has passed by at least one of the sensors in the group. Therefore, a count signal will be generated, all sensors in the group will be disabled from generating future count signals.

The foregoing describes one processing cycle. The next set of light readings is then processed in a like manner.

Several variations in the foregoing steps may be made without departing from the spirit and scope of the invention. First, it is not necessary to modify the MAXIMUM LIGHT LEVEL and MINIMUM LIGHT LEVEL indicators for sensors below the PRESENCE THRESHOLD. These indicators are only used for sensors above the PRESENCE THRESHOLD.

Another variation is to dispense with the MINIMUM LIGHT LEVEL indicators and the NEW OBJECT THRESHOLD if a PRESENCE THRESHOLD is chosen which is above the highest reflected light level when two object touch. In such instances, a sensor will always fall below the PRESENCE THRESHOLD when an object passes by it, even if it is immediately followed by another object touching the first object.

Another variation is to not allow any sensor to be grouped with an adjacent sensor if the adjacent sensor is disabled. In this case, the sensor in a group are "fixed" when a count signal is generated. However, this variation does not generate accurate count signals if a long, narrow object is passed by the sensors diagonally. In such a case, a count signal will be generated and the group will be "fixed" as soon as the first portion of the object passes by the sensors. When the rest of the object passes by the adjacent sensors, a separate count signal (and group) will be generated. However, this variation may allow a higher PRESENCE THRESHOLD to be used in some instances.

Another variation which may be made is in the timing of generating a count signal. It should be noted that depending on the PRESENCE THRESHOLD selected, whenever a sensor increases above the PRESENCE THRESHOLD, a count signal will eventually be generated by either that sensor or a contiguous sensor. The signal may be generated when a sensor first goes above the PRESENCE THRESHOLD, or at any other time, but in the preferred embodiment, the count signal is generated when a sensor that was at one time above the PRESENCE THRESHOLD drops by the PEAK DETECTION THRESHOLD.

Another variation which may be made in the method of the invention relates to the timing when sensors belonging to a group which has generated a count signal are reenabled to generate future count signals. When a sensor is reenabled, it is logically no longer a part of the same group, i.e., it may rise and fall to generate a separate count signal for a different object. In the preferred embodiment, no sensor is reenabled until it has fallen by the PEAK DETECTION THRESHOLD amount. Even then, reenablement only occurs when a sensor drops below the PRESENCE THRESHOLD or if, after falling from its MAXIMUM LIGHT LEVEL by the PEAK DETENTION THRESHOLD amount, the sensor rises by the NEW OBJECT THRESHOLD amount. However, it is also possible to reenable a sensor to generate future count signals whenever a sensor drops below the PRESENCE THRESHOLD, even if the sensor has not dropped by the PEAK DETECTION THRESHOLD. This would occur, for example, for sensor 4 at reading 16 in FIG. 6. In such instances, however, the sensor must not generate a count signal if, after falling below the PRESENCE THRESHOLD, it also falls from its MAXIMUM LIGHT LEVEL by the PEAK DETECTION THRESHOLD amount.

Another interesting feature of the invention is that it allows minor fluctuations of light to occur without incorrectly generating count signals. For example, in some instances, a light reading may decrease and then immediately increase. This could be caused for example, by dirt on an object that reflects less light than the remaining surface of the object. However, as long as the light fluctuation does not cause a light variation greater than the PRESENCE THRESHOLD or the PEAK DETECTION THRESHOLD, the variation will be ignored and the method will function correctly. It should also be noted that taking several sensor readings and averaging each prior to processing also helps reduce any errors due to aberrant reflective light fluctuations of an object.

Figure 8:
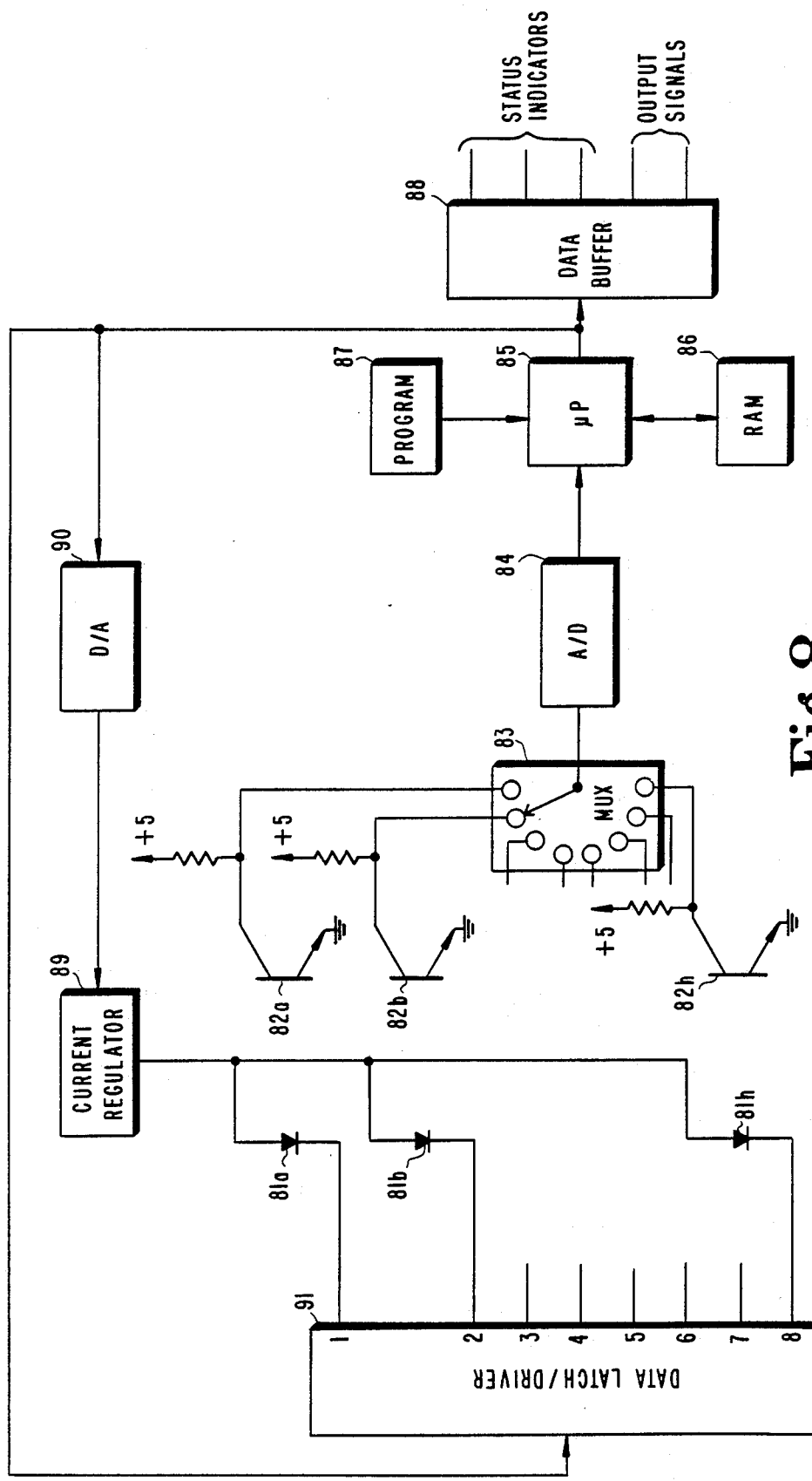
FIG. 8 is a block diagram of the electronic portion of the device and system in accordance with the invention.

FIG. 8 is a block diagram of the electronic portion of the device and system in accordance with the invention. Eight infrared light emitting diodes 81a through 81h (Siemens SFH 484) emit light into the area being scanned. Infrared emitters and detectors are employed in the preferred embodiment because of the low incidence of this frequency of light in the typical production facility. However, any other matched frequency emitter and detector may be used.

Light emitter 81a is activated through data latch/-driver 91, and an analog voltage from infrared detector 82a (Honeywell 8403-302 phototransistor) is selected through multiplexer 83 (MC145041) and converted to a digital byte signal by A/D convertor (MC145041) 84. In the preferred embodiment, the analog voltage is converted to a byte between 0 and 255, wherein a 0 indicates the MAXIMUM LIGHT LEVEL level of light detectable by a light detector, and a 255 indicates the MINIMUM LIGHT LEVEL level of light is detected by a light detector. Microprocessor 85 (80C451) then stores the complement of each digital signal in RAM 86 (6264). The complement represents the relative Z-coordinate of the object with reference to the particular light detector (X-coordinate) and object "slice" (or time) location (Y-coordinate) of the object. The next light emitter 81b and light detector 82b pair is then selected by data latch/driver 91 and multiplexer 83, respectively, and the process is repeated for each photodetector. All digital signals are stored to provide a representation of one "slice" of the area being scanned. The process is then repeated to store the next slice in RAM 86. Multiple slice readings together form a matrix of relative Z-coordinates representative of the contour of the area being scanned. Each individual LEDP represents an X-coordinate, and the Y-coordinates represent the distance between adjacent slice readings. The actual Y-coordinates are a function of both the frequency of slice readings and the speed of the objects as they pass by the LEDPs.

As described more fully above, microprocessor 85 processes the digital signals from light detectors 82 using instructions in ROM 87 and outputs several signals to data buffer 88. Such signals may consists of, for example, count, status and power signals. Microprocessor 85 may also monitor the high and low digital signals from each light detector 82 over time. If the voltage range produced by the photodetectors becomes narrow due to device wear or dirt on the light components, the current to light emitters 81 may be increased or decreased accordingly to cause a corresponding change in the current produced by light detectors 82. Such increase or decrease is accomplished by analog programmable constant current source 89 based on a signal from digital to analog converter 90, which in turn is generated by microprocessor 85.

As the polling conducted by data/latch driver and multiplexer 83 can generate signals much faster than is typically required for most applications, microprocessor 85 may be easily programmed to average several consecutive signals from the same light detector and to process the average. Such a method reduces inaccurate readings caused by object vibration, surface discoloration or other aberrant changes in reflective characteristics on an object's surface. In the preferred embodiment, slice readings are taken every 4 ms.

It should further be noted that the method of generating count signals of the invention does not require the processing of more than one set of light readings at one time. Thus, it is unnecessary to store as a matrix more than one set of readings. However, such matrix storage could be done, for example, to compute the volume of objects based on well known mathematical techniques. In such instances, it is preferable for all sensors to be calibrated so that the same level of reflected light generates identical light level readings for multiple sensors, as this eliminates the need for correlation among adjacent sensors. In addition, it is preferable to closely space the sensors to increase the resolution of an object's surface.

It may also be appreciated that the "peak detecting" method of the present invention employs the concept of generating count signals by matching reflected light data with a predetermined object characteristic. In the preferred embodiment, count signals are generated as expected object "peaks" are detected. These peaks are detected by detecting a drop in reflected light intensity at least as great as the PEAK DETECTION THRESHOLD amount of reflected light. However, any other matching of object characteristics and reflected light characteristics may be employed to generate count signals. For example, the algorithm may be easily adapted to recognize corners of objects or holes in centers of an object such as a nut. Such methods are within the scope and spirit of the present invention.

It may also be appreciated that different steps in the method described above may be done at various times. For example, in the preferred embodiment, the MAXIMUM LIGHT LEVEL is reset when a sensor either rises above the PRESENCE THRESHOLD or, if after falling from its MAXIMUM LIGHT LEVEL by the PEAK DETECTION THRESHOLD amount, the sensor rises by the NEW OBJECT THRESHOLD. However, the MAXIMUM LIGHT LEVEL may be reset anytime after either of these occurrences, as long as it is reset prior to its reaching the sensor's next MAXIMUM LIGHT LEVEL light reading.

In the preferred embodiment, the MINIMUM LIGHT LEVEL is reset each time a sensor drops from its MAXIMUM LIGHT LEVEL by the PEAK DETECTION THRESHOLD amount. However, this MINIMUM LIGHT LEVEL can be reset anytime after this time but before the light level begins to rise.

Likewise, a count signal could be generated anytime between the time the first sensor in a group rises above the PRESENCE THRESHOLD and the time when the first sensor in the group encounters a new object. The only requirement is that whenever a count signal is generated, the sensors in the group must be disabled from generating future count signals until a subsequent object is encountered.

Another modification which may be made to the device of the invention is to place the light emitter-detector apparatus on a movable arm and move it past a fixed surface area to be scanned.

We claim:

1. A system for counting the number of randomly positioned high light reflective areas of a scanned area, comprising:
   a plurality of spaced light detectors,
   means for monitoring the intensity of light detected by each light detector,
   means for converting each monitored light intensity to a digital signal corresponding to the degree of intensity of the monitored light,
   memory means for storing each converted digital signal,
   means for repeatedly performing said monitoring, converting and storing functions for all of said light detectors, and
   means for generating a count signal when a light level digital signal, after being above a predefined PRESENCE THRESHOLD, decreases by a predefined PEAK DETECTION THRESHOLD.

2. The system of claim 1, further comprising counter means for counting the total number of count signals generated.

3. The system of claim 1, further comprising a light emitter associated with each light detector, wherein each light emitter and detector pair may be simultaneously activated to the exclusion of all other light emitter and detector pairs when monitoring the intensity of light detected by the activated light detector.

4. The system of claim 3 wherein:
   the means for monitoring the intensity of light detected by each light detector comprises a data latch/driver coupled to each light emitter, a multiplexer coupled to each light detector, and a microprocessor coupled to said data latch/driver and said multiplexer, whereby the microprocessor may simultaneously activate an individual light emitter-detector pair.

5. The system of claim 1, wherein the light detectors traverse the width of a conveyor on which objects to be detected may be placed.

6. The system of claim 1, further comprising means for complementing each digital signal.

7. The system of claim 1, wherein the light detectors are equally spaced.

8. The system of claim 1, further comprising:
   means for moving the position of the scanned area relative to the light detectors.

9. The system of claim 8, wherein the light detectors are fixed over a moving conveyor.

10. The system of claim 8, wherein the light detectors are movable with respect to the scanned area.

11. The system of claim 1, further comprising light filter means for filtering ambient light from each light detector.

12. In a system for counting randomly positioned high light reflective sections of scanned area, in which the high light reflective sections are separated by areas that reflect less light,
   and wherein said system includes means for repeatedly generating sets of reflected light intensity readings, each such set representing the intensity of light reflected by discrete, linearly-adjusted portions of the scanned area,
   and wherein the distance between each discrete, linearly-adjacent portion is less than the minimum width of any less-reflective light area of the scanned area,
   the method of:
   enabling a light level reading to generate a count signal when the light level reading, after being above a predefined PRESENCE THRESHOLD and falling by a predetermined PEAK DETECTION THRESHOLD, but not below the PRESENCE THRESHOLD, rises by a predefined NEW OBJECT THRESHOLD.

13. In a system for counting randomly positioned high light reflective sections of a scanned area in which the high light reflective sections are separated by areas that reflect less light,
   and wherein said system includes means for repeatedly generating sets of reflected light intensity readings, each such set representing the intensity of light reflected by discrete, linearly-adjacent portions of the scanned area,
   and wherein the distance between each discrete, linearly-adjacent portion is less than the minimum width of any less-reflective light area of the scanned area,
   the method of:
   disabling a light level reading from generating a count signal until the light intensity level, after being above a predefined PRESENCE THRESHOLD, decreases by a predefined PEAK DETECTION THRESHOLD.

14. The method of claim 13, further comprising the step of recording the maximum intensity of each enabled light intensity reading while the reading is above the PRESENCE THRESHOLD,
   and resetting the maximum intensity for a light intensity reading when the intensity, before falling below the PRESENCE THRESHOLD, rises by a predefined NEW OBJECT THRESHOLD.

15. The method of claim 13, further comprising the step of recording the maximum intensity of each enabled light intensity reading while the reading is above the PRESENCE THRESHOLD,
   and resetting the maximum intensity for a light intensity reading when the intensity falls below the PRESENCE THRESHOLD.

16. The method of claim 13, further comprising the step of recording the maximum intensity of each enabled light intensity reading while the reading is above the PRESENCE THRESHOLD, and resetting the maximum intensity for a light intensity reading when the intensity either:

(a) before falling below the PRESENCE THRESHOLD, rises by a predefined NEW OBJECT THRESHOLD amount, or (b) falls below the PRESENCE THRESHOLD.

17. The methods of any of claims 13–16, further comprising the step of:

reenabling a light level reading to generate a count signal when its maximum light level is reset.

18. In a system for counting randomly positioned high light reflective sections of a scanned area in which the high light reflective sections are separated by areas that reflect less light, and wherein said system includes means for repeatedly generating sets of reflected light intensity readings, each such set representing the intensity of light reflected by discrete, linearly-adjusted portions of the scanned area, and wherein the distance between each discrete, linearly-adjacent portion is less than the minimum width of any less-reflective light area of the scanned area, the method of:

generating a count signal when a light level reading, after being above a predefined PRESENCE THRESHOLD, decreases by a predefined PEAK DETECTION THRESHOLD.

19. The method of claim 18, further comprising the step of recording the maximum intensity of each enabled light intensity reading while the reading is above the PRESENCE THRESHOLD, and resetting the maximum intensity for a light intensity reading when the intensity, before falling below the PRESENCE THRESHOLD, rises by a predefined NEW OBJECT THRESHOLD.

20. The method of claim 18, further comprising the step of recording the maximum intensity of each enabled light intensity reading while the reading is above the PRESENCE THRESHOLD, and resetting the maximum intensity for a light intensity reading when the intensity falls below the PRESENCE THRESHOLD.

21. The method of claim 18, further comprising the step of recording the maximum intensity of each enabled light intensity reading while the reading is above the PRESENCE THRESHOLD, and resetting the maximum intensity for a light intensity reading when the intensity either;

(a) before falling below the PRESENCE THRESHOLD rises by a predefined NEW OBJECT THRESHOLD amount, or (b) falls below the PRESENCE THRESHOLD.

22. The method of any of claims 12–16 or 18–21, further comprising the step of:

always disabling from generating a count signal, whenever a first light level reading is disabled from generating a count signal, all light level reading that are above the PRESENCE THRESHOLD and are from light detectors contiguous to the light detector from which said first light level reading was taken.

23. In a system for counting randomly positioned high light reflective sections of a scanned area, in which the high light reflective sections are separated by areas that reflect less light, and wherein said system includes means for repeatedly generating sets of reflected light intensity readings, each such set representing the intensity of light reflected by discrete, linearly-adjusted portions of the scanned area, and wherein the distance between each discrete, linearly-adjacent portion is less than the minimum width of any less-reflective light area of the scanned area, and wherein said system includes means for disabling a light intensity reading from generating a count signal, the method of: always disabling from generating a count signal, whenever an individual light level reading is so disabled, all light intensity readings that are above a PRESENCE THRESHOLD and are from light detectors contiguous to the light detector from which said first light intensity reading was taken.

24. The method of claim 23 in which a count signal is generated when the light level readings are disabled.

25. The method of claim 23 in which each individual disabled light level reading is reenabled to generate a count signal when it falls below the PRESENCE THRESHOLD.

26. The method of claim 23 in which each individual disabled light level reading is reenabled to generate a count signal when it, after decreasing by a PEAK DETECTION THRESHOLD, rises by a predefined NEW OBJECT THRESHOLD.

27. The method of claim 23 in which each individual disabled light level reading is reenabled to generate a count signal when it either:

(a) falls below the PRESENCE THRESHOLD; or (b) after decreasing by a PEAK DETECTION THRESHOLD, rises by a predefined NEW OBJECT THRESHOLD.

28. The method of any claims 12–16, or 18–21, or 23–27, in which the high light reflective area comprise objects.

29. The method of any of claims 12–16, 18–21, or 23–27, in which the means for generating light readings includes an array of light detectors traversing the scanned area.

30. The method of claim 29 in which the scanned area comprises a conveyor carrying randomly positioned objects to be counted.

31. A system for counting the number of randomly positioned high light reflective areas of a scanned area, comprising:

a plurality of spaced light detectors, means for monitoring the intensity of light detected by each light detector, means for converting each monitored light intensity to a digital signal corresponding to the degree of intensity of the monitored light, memory means for storing each converted digital signal, means for repeatedly performing said monitoring, converting and storing functions for all of said light detectors, and means for enabling a converted digital signal to generate a count signal when it, after being above a predefined PRESENCE THRESHOLD and falling by a predefined PEAK DETECTION THRESHOLD, but not below the PRESENCE THRESHOLD, rises by a predefined NEW OBJECT THRESHOLD.

32. A system for counting the number of randomly positioned high light reflective areas of a scanned area, comprising:
- a plurality of spaced light detectors,
- means for monitoring the intensity of light detected by each light detector,
- means for converting each monitored light intensity to a digital signal corresponding to the degree of intensity of the monitored light,
- memory means for storing each converted digital signal,
- means for repeatedly performing said monitoring, converting and storing functions for all of said light detectors,
- means for disabling a converted digital signal from generating a count signal, and
- means for always disabling from generating a count signal, whenever an individual first converted digital signal is so diabled, all light intensity readings that are above a PRESENCE THRESHOLD and are generated by light detectors contiguous to the light detector that generated said first converted digital signal.

* * * * *